(12) United States Patent
Takemoto et al.

(10) Patent No.: US 10,940,663 B2
(45) Date of Patent: Mar. 9, 2021

(54) HIGH-PRESSURE GAS STORAGE CONTAINER AND METHOD FOR PRODUCING HIGH-PRESSURE GAS STORAGE CONTAINER

(71) Applicant: Nissan Motor Co., Ltd., Yokohama (JP)

(72) Inventors: Shinichiro Takemoto, Kanagawa (JP); Hiroshi Uchida, Kanagawa (JP); Kentaro Kono, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 266 days.

(21) Appl. No.: 16/081,441

(22) PCT Filed: Sep. 29, 2016

(86) PCT No.: PCT/JP2016/078928
§ 371 (c)(1),
(2) Date: Aug. 31, 2018

(87) PCT Pub. No.: WO2017/149817
PCT Pub. Date: Sep. 8, 2017

(65) Prior Publication Data
US 2019/0077109 A1 Mar. 14, 2019

(30) Foreign Application Priority Data
Mar. 4, 2016 (JP) .............................. JP2016-042730

(51) Int. Cl.
*B32B 1/02* (2006.01)
*F17C 1/06* (2006.01)
(Continued)

(52) U.S. Cl.
CPC ................. *B32B 1/02* (2013.01); *B32B 5/02* (2013.01); *B32B 5/12* (2013.01); *B32B 5/147* (2013.01); *B32B 27/04* (2013.01); *C08J 5/06* (2013.01); *D06M 10/00* (2013.01); *F17C 1/06* (2013.01); *F17C 1/08* (2013.01); *B32B 2260/046* (2013.01); *F17C 2201/0109* (2013.01); *F17C 2201/056* (2013.01);
(Continued)

(58) Field of Classification Search
CPC .... B32B 1/02; B32B 5/02; B32B 5/12; B32B 5/147; B32B 2260/046; F17C 1/06; F17C 1/08; F17C 2203/0604; F17C 2203/0609; F17C 2203/0612; F17C 2203/067; F17C 2209/2154; F17C 2221/012; F17C 2260/011; F17C 2260/012; C08J 5/06; Y10T 428/1369
See application file for complete search history.

(56) References Cited

FOREIGN PATENT DOCUMENTS

| | | |
|---|---|---|
| JP | 61-258065 A | 11/1986 |
| JP | 63-144153 A | 6/1988 |

(Continued)

*Primary Examiner* — Walter Aughenbaugh
(74) *Attorney, Agent, or Firm* — Global IP Counselors, LLP

(57) ABSTRACT

A high-pressure gas storage container includes a liner and a reinforcing layer. The liner houses a high-pressure gas. The reinforcing layer is formed by winding a plurality of strip-shaped reinforcing members around an outer perimeter surface of the liner. The reinforcing members are made of a plurality of reinforcing fibers that are impregnated with a resin. At least a portion of the reinforcing fibers is irradiated with plasma.

6 Claims, 5 Drawing Sheets

(51) Int. Cl.
*C08J 5/06* (2006.01)
*D06M 10/00* (2006.01)
*B32B 27/04* (2006.01)
*B32B 5/12* (2006.01)
*B32B 5/02* (2006.01)
*B32B 5/14* (2006.01)
*F17C 1/08* (2006.01)

(52) U.S. Cl.
CPC ............... *F17C 2203/0604* (2013.01); *F17C 2203/066* (2013.01); *F17C 2203/067* (2013.01); *F17C 2203/0609* (2013.01); *F17C 2203/0612* (2013.01); *F17C 2203/0619* (2013.01); *F17C 2203/0621* (2013.01); *F17C 2203/0636* (2013.01); *F17C 2203/0665* (2013.01); *F17C 2209/2154* (2013.01); *F17C 2221/012* (2013.01); *F17C 2260/011* (2013.01); *F17C 2260/012* (2013.01); *F17C 2270/0168* (2013.01); *Y10T 428/1369* (2015.01)

(56) References Cited

FOREIGN PATENT DOCUMENTS

| | | |
|---|---:|---|
| JP | 4-249545 A | 9/1992 |
| JP | 2005-9559 A | 1/2005 |
| JP | 2005-337394 A | 12/2005 |
| JP | 2006-233354 A | 9/2006 |
| JP | 2006-307947 A | 11/2006 |
| JP | 2014-113755 A | 6/2014 |
| JP | 2015-81401 A | 4/2015 |
| JP | 2016-56240 A | 4/2016 |

HIGH-PRESSURE GAS STORAGE CONTAINER AND METHOD FOR PRODUCING HIGH-PRESSURE GAS STORAGE CONTAINER

CROSS-REFERENCE TO RELATED APPLICATIONS

This application is a U.S. national stage application of International Application No. PCT/JP2016/078928, filed on Sep. 29, 2016, which claims priority to Japanese Patent Application No. 2016-042730, filed on Mar. 4, 2016. The entire contents disclosed in Japanese Patent Application No. 2016-042730 is hereby incorporated herein by reference.

BACKGROUND

Field of the Invention

The present invention relates to a high-pressure gas storage container and a method for producing a high-pressure gas storage container.

Background Information

In recent years, reinforcing members obtained by impregnating reinforcing fibers with resin have attracted attention as automobile parts. In general, because reinforcing fibers have low adhesiveness to resin, it is necessary to improve the adhesiveness of the reinforcing fibers to the resin.

In relation to the foregoing, for example, Japanese Laid Open Patent Application No. 61-258065 (Patent Document 1) discloses an adhesiveness improvement method for modifying the surface of an aromatic polyamide fiber and improving the adhesiveness by irradiating plasma on the aromatic polyamide fiber from a direction that is orthogonal to the arrangement surface of the fibers.

SUMMARY

On the other hand, in recent years, hydrogen gas, etc., has been used as a fuel for automobiles, and a high-pressure gas storage container is installed in such automobiles. With such high-pressure gas storage containers, predetermined strengths are required in terms of tensile strength and bending strength.

However, when simply winding a composite member around the outer perimeter of a liner of a gas cylinder, it is necessary to wind many reinforcing members in order to achieve a predetermined strength, and there is the possibility that the weight of the whole container will be increased.

In order to solve the problem described above, an object of the present invention is to provide a high-pressure gas storage container and a method for producing a high-pressure gas storage container that can achieve a reduction in weight while maintaining an appropriate strength imparted by reinforcing members.

A high-pressure gas storage container according to the present invention that achieves the object described above comprises a liner for housing high-pressure gas and a reinforcing layer that is formed by winding strip-shaped reinforcing members around the outer perimeter surface of the liner. The reinforcing members described above are made of reinforcing fibers that are impregnated with resin and at least a portion of which is irradiated with plasma.

In addition, the method for producing a high-pressure gas storage container according to the present invention that achieves the object described above is a method for producing a high-pressure gas storage container comprising a liner for housing high-pressure gas and a reinforcing layer that is formed by winding strip-shaped reinforcing members around the outer perimeter surface of the liner. In the method for producing a high-pressure gas storage container, plasma is irradiated on at least a portion of reinforcing fibers and the reinforcing fibers are impregnated with a resin to form the reinforcing members, and the reinforcing members are wound around the outer perimeter surface of the liner.

DETAILED DESCRIPTION OF THE EMBODIMENTS

Embodiments of the present invention will be explained below, with reference to the appended drawings. In the explanations of the drawings, the same elements are given the same reference symbols, and redundant explanations are omitted. Dimensional ratios of the drawings are exaggerated for convenience of explanation and may be different from the actual ratios.

Figure 1:
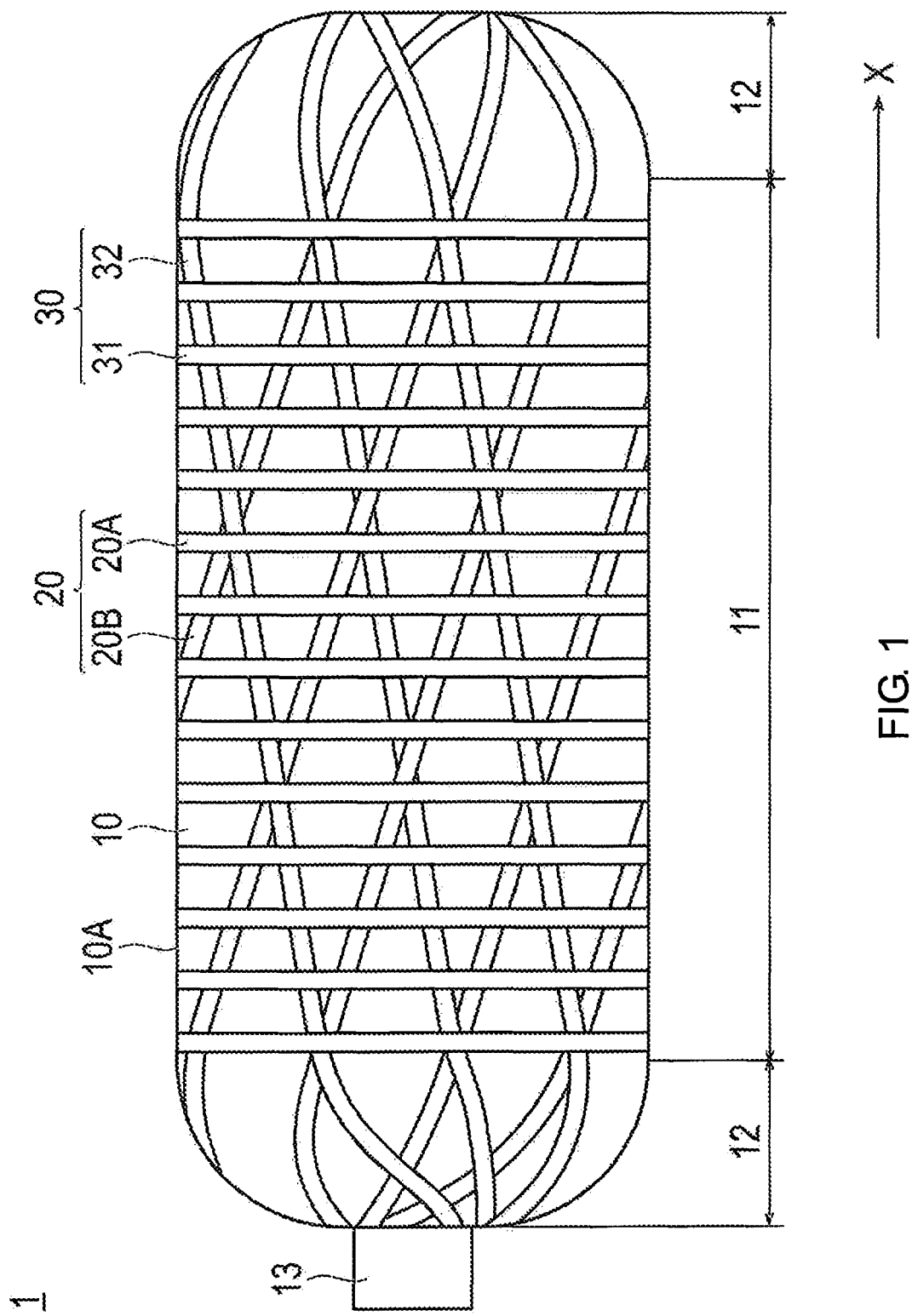
FIG. 1 is a view illustrating a high-pressure gas storage container according to the present embodiment.
Figure 2:
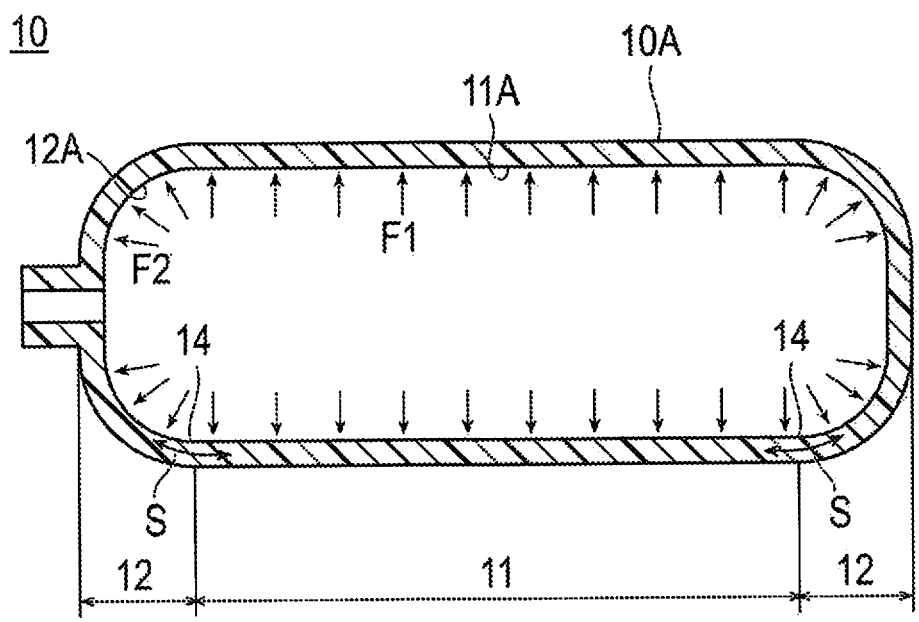
FIG. 2 is a cross-sectional view illustrating a liner of the high-pressure gas storage container.
Figure 3:
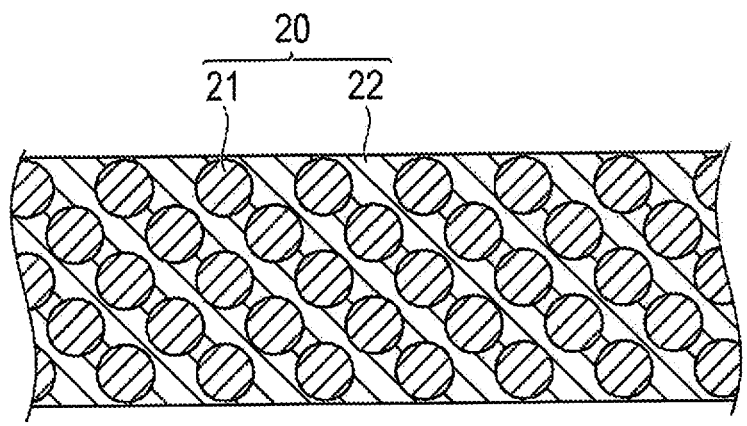
FIG. 3 is a cross-sectional view illustrating a portion of a reinforcing member made of reinforcing fibers impregnated with a resin.

FIG. 1 is a view illustrating a high-pressure gas storage container 1 according to the present embodiment. FIG. 2 is a cross-sectional view illustrating a liner 10 of the high-pressure gas storage container 1. FIG. 3 is a cross-sectional view illustrating a portion of reinforcing members 20 made of reinforcing fibers 21 impregnated with a resin 22. For ease of understanding, FIG. 1 shows a process in which the reinforcing members 20 are wound around the outer perimeter surface 10A of the liner 10.

High-Pressure Gas Storage Container

Figure 5:
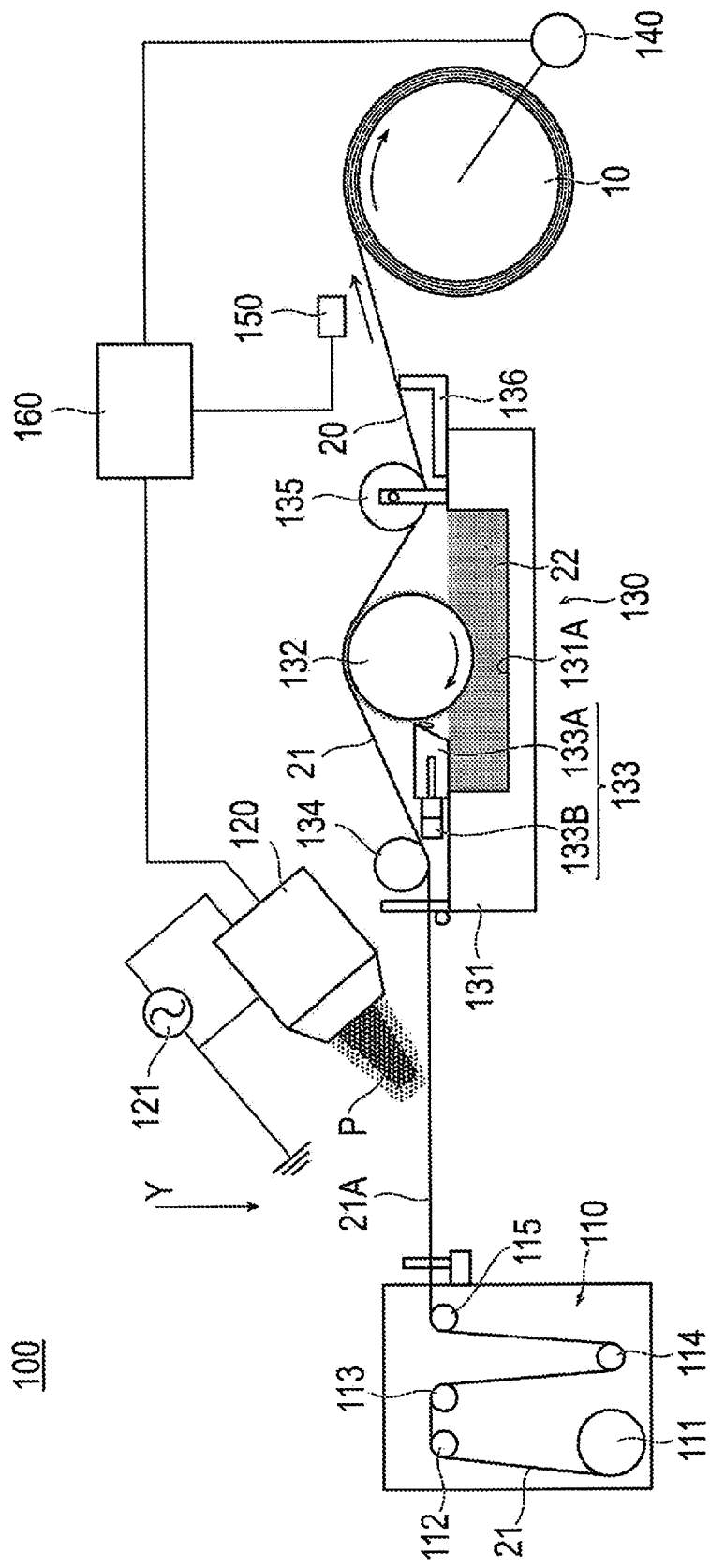
FIG. 5 is a view illustrating a device for producing the high-pressure gas storage container.

In general, the high-pressure gas storage container 1 according to the present embodiment comprises a liner 10 for housing high-pressure gas, such as hydrogen gas, and a reinforcing layer 30 that is formed by winding strip-shaped reinforcing members 20 around the outer perimeter surface 10A of the liner 10, as illustrated in FIG. 1. In addition, the reinforcing members 20 are made of reinforcing fibers 21 that are impregnated with resin 22 and that are irradiated with plasma P, as illustrated in FIGS. 3, 5. The configuration of the high-pressure gas storage container 1 according to the present embodiment will be described in detail below.

The liner 10 is formed as a tank having a cylindrical shape. The liner 10 has gas barrier properties and suppresses the permeation of high-pressure gas to the outside. The liner 10 comprises a body portion 11 that is provided at the center in the axial direction X, mirror portions 12 that are provided on both sides of the body portion 11 in the axial direction X, and a mouthpiece 13 that is provided in one of the mirror portions 12, as illustrated in FIGS. 1, 2.

The body portion 11 is configured in a tubular shape so as to extend in the axial direction X. The mirror portions 12 are curved so as to taper outwardly in the axial direction X towards the outside.

A radially outward force F1 acts on the inner perimeter surface 11A of the body portion 11 due to high-pressure gas that is housed therein, as illustrated in FIG. 2. In addition, a force F2 along a direction that is orthogonal to the inner perimeter surface 12A acts on the inner perimeter surfaces 12A of the mirror portions 12 due to high-pressure gas being housed therein. The magnitudes of force F1 and force F2 are equal. Consequently, bending stress S is generated at shoulder portions 14, which are the boundary portions between the inner perimeter surface 11A of the body portion 11 and the inner perimeter surfaces 12A of the mirror portions 12, requiring more strength against bending stress compared to other portions.

The mouthpiece 13 is configured protruding from the mirror portion 12 outward in the axial direction X. A pipe is connected, or a valve mechanism comprising an on-off valve or a pressure reducing valve is connected, to the mouthpiece 13 in order to charge and discharge high-pressure gas into and out of the high-pressure gas storage container 1. The mouthpiece 13 may be provided on the mirror portions 12 on both sides.

A metal or synthetic resin material may be used to constitute the liner 10. Examples of metals that can be used include iron, aluminum, and stainless steel. Examples of synthetic resins that can be used include polyethylene, polyamide, and polypropylene.

The reinforcing layer 30 is formed by winding a predetermined number of reinforcing members 20 around the outer perimeter surface 10A of the liner 10. The number of times of winding the reinforcing members 20, that is, the number of layers of the reinforcing layer 30, is not particularly limited but is, for example, 20 to 30. By winding the reinforcing members 20 around the outer perimeter surface 10A of the liner 10, the reinforcing layer 30 improves the pressure resistance strength of the liner 10. Below, a schematic configuration of the reinforcing members 20 will be described first, after which the configuration of the reinforcing layer 30 will be described.

The reinforcing members 20 are made of reinforcing fibers 21 that are impregnated with resin 22, as illustrated in FIG. 3. The reinforcing members 20 include a reinforcing member 20A that is wound in a hoop layer 31 and a reinforcing member 20B that is would in a helical layer 32, which are described later.

The reinforcing fibers 21 according to the present embodiment are formed by plasma P being irradiated thereon. In this manner, by irradiating plasma P on the reinforcing fibers 21, it is possible to add an acid functionality to the reinforcing fibers 21. As a result, the adhesiveness of the resin 22 to the reinforcing fibers 21 is improved, and the strength as reinforcing members 20 is improved.

Examples of reinforcing fibers 21 that can be used include carbon fiber, glass fiber, and polyamide fiber. In the present embodiment, carbon fiber, which will be described as an example, has a low thermal expansion coefficient, excellent dimensional stability, and little reduction in mechanical properties even at high temperatures. Reinforcing fibers 21 are formed in the state of a bundle of about 1,000 to 50,000 carbon fibers.

Examples of resin 22 that can be used include thermosetting resin and thermoplastic resin. Examples of thermosetting resin that can be used include epoxy resin, polyester resin, and phenol resin. Examples of thermoplastic resin that can be used include polyamide resin and polypropylene resin.

Figure 4A:
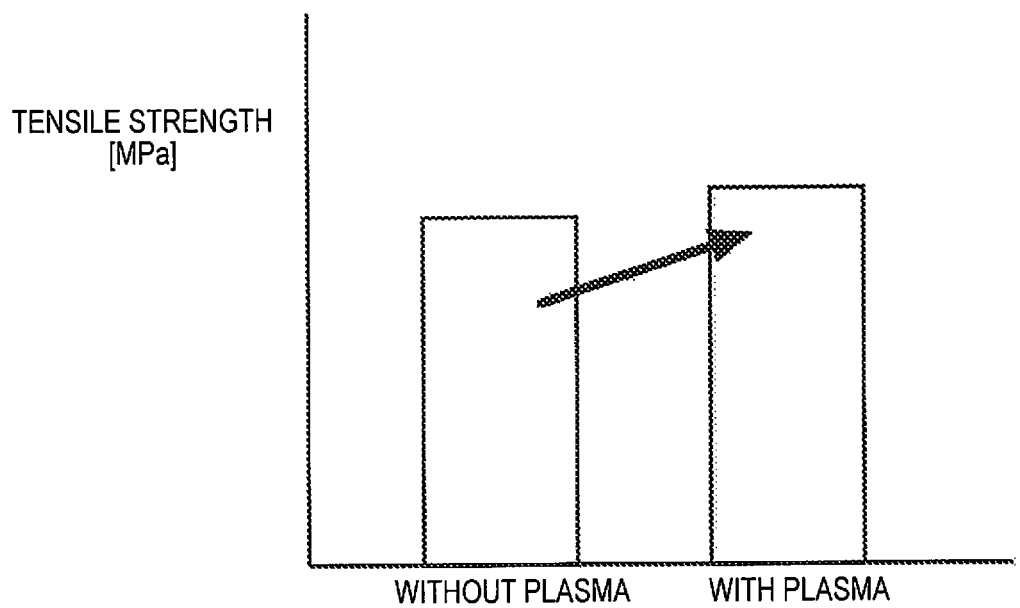
FIG. 4A is a graph illustrating a state in which the tensile strength is improved by irradiating plasma.
Figure 4B:
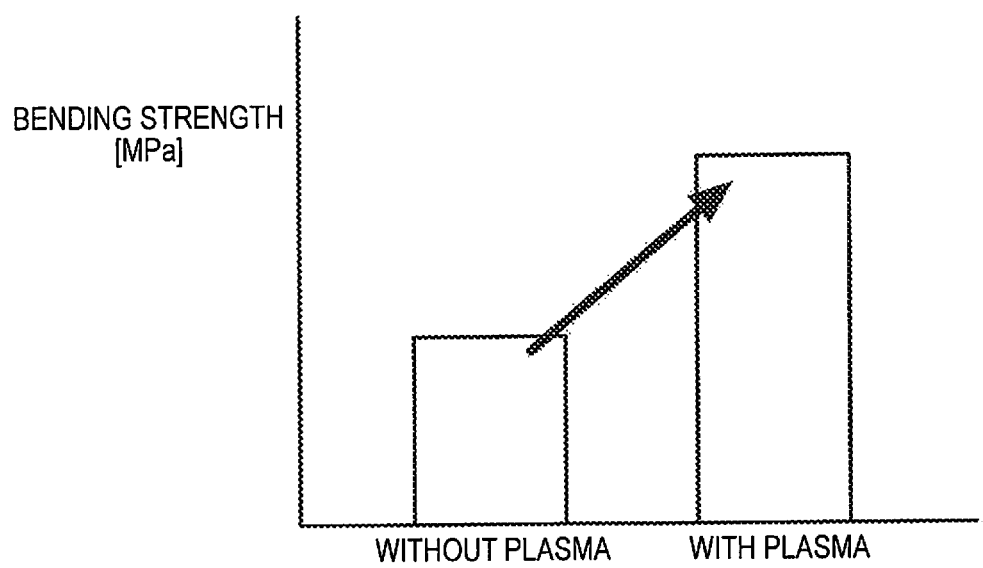
FIG. 4B is a graph illustrating a state in which the bending strength is improved by irradiating plasma.

FIG. 4A is a graph illustrating a state in which the tensile strength of the reinforcing members 20 is improved by irradiating plasma P. FIG. 4B is a graph illustrating a state in which the bending strength of the reinforcing members 20 is improved by irradiating plasma P. In FIG. 4A and FIG. 4B, the left side indicates the strength of a test piece obtained by impregnating, with resin 22, carbon fibers having monofilaments numbering 30,000 or more, also known as large tow carbon fibers. In addition, the right side indicates the strength of a test piece obtained by irradiating plasma P on the large tow and impregnating the large tow with resin 22.

The tensile strength of the reinforcing members 20 is improved by irradiating plasma P, as illustrated in FIG. 4A. In addition, the bending strength of the reinforcing members 20 is improved by irradiating plasma P, as illustrated in FIG. 4B. As can be seen by comparing FIG. 4A and FIG. 4B, the bending strength is more suitably improved than the tensile strength by irradiating plasma P on the reinforcing fibers 21.

The reinforcing layer 30 includes a hoop layer 31 formed by winding the reinforcing member 20A around the body portion 11 along the circumferential direction and a helical layer 32 formed by winding the reinforcing member 20B around the body portion 11 and the mirror portions 12 in a spiral shape, as illustrated in FIG. 1. The hoop layer 31 and the helical layer 32 are alternately stacked. It is not necessary for the hoop layer 31 and the helical layer 32 to be alternately stacked.

Because the hoop layer 31 is formed by the reinforcing member 20A being wound around the body portion 11, the tensile strength in the radial direction of the body portion 11 is thereby secured. Here, because stress concentration is unlikely to occur in the body portion 11, the reinforcing member 20A that is wound in the hoop layer 31 is configured to have a relatively low strength. Therefore, the amount of plasma P that is irradiated on the reinforcing fibers 21 that constitute the reinforcing member 20A is relatively small. As described above, the amount of plasma P that is irradiated on the reinforcing fibers 21 that constitute the reinforcing member 20A can be small also because the improvement in the tensile strength of the reinforcing members 20 by irradiating plasma P is relatively small.

Because the helical layer 32 is formed by the reinforcing member 20B being wound around the body portion 11 and the mirror portions 12, the strength in the axial direction X of the high-pressure gas storage container 1 is thereby secured. Therefore, the helical layer 32 secures the strength of the shoulder portions 14 where bending strength is required. Accordingly, the reinforcing member 20B that is wound in the helical layer 32 is configured to have a relatively high strength. Therefore, the amount of plasma P that is irradiated on the reinforcing fibers 21 that constitute the reinforcing member 20B is relatively large. As described above, because the bending strength of the reinforcing members 20 is suitably improved by means of irradiating plasma P, it is possible to suitably secure the bending strength of the shoulder portions 14.

Device for Producing the High-Pressure Gas Storage Container

Next, a manufacturing device 100 of the high-pressure gas storage container 1 according to the present embodiment will be described, with reference to FIG. 5. FIG. 5 is a view illustrating a manufacturing device 100 of a high-pressure gas storage container 1.

The manufacturing device 100 of the high-pressure gas storage container 1 comprises a housing unit 110, an irradiation unit 120, an impregnation unit 130, a transport unit 140, a detection unit 150, and a control unit 160, as illustrated in FIG. 5.

The housing unit 110 houses bobbin-like reinforcing fibers 21. The housing portion 110 includes a setting part 111 to which the bobbin-like reinforcing fibers 21 are set and four rollers 112-115 that maintain the tensile force of the reinforcing fibers 21.

The irradiation unit 120 irradiates plasma P on the reinforcing fibers 21. As the present applicant has disclosed in Japanese Patent Application No. 2014-181512, the irradiation unit 120 preferably irradiates plasma P from a direction that is tilted from the surface 21A of the reinforcing fibers 21 in the Y direction (direction orthogonal to the surface 21A). The irradiation unit 120 preferably irradiates plasma P on the surface 21A of the reinforcing fibers 21 from a direction that is tilted by 30° or more with respect to the Y direction. By irradiating the plasma P from a direction that is tilted with respect to the Y direction in this manner, plasma P is irradiated obliquely on the surface 21A of the reinforcing fibers 21, so compression of the plasma gas is suppressed, and it is possible to carry out irradiation while letting the high-temperature portion in the center escape. Therefore, it is possible to efficiently irradiate plasma P on the reinforcing fibers 21 and to add an acid functionality to the reinforcing fibers 21 while reducing damage to the reinforcing fibers 21.

It is preferable to use an AC power source 121 as the power source of the irradiation unit 120. The AC power source 121 is grounded (grounded).

The irradiation intensity of the plasma P that is irradiated from the irradiation unit 120 can be adjusted by adjusting the plasma voltage, current, frequency, electrode, and gas conditions (composition of the gas). Hereinbelow, "adjusting the irradiation intensity of the plasma P" in the present Specification shall mean adjusting the irradiation intensity of the plasma P by adjusting at least one of the above-described conditions of plasma voltage, current, frequency, electrode, and gas.

One example of the irradiation condition of the plasma P will be described below.

From the point of view of the ease with which plasma P is generated, the plasma voltage is, for example, 200-400 V, and is preferably 260-280 V.

From the point of view of the ease with which plasma P is generated, the pulse discharge frequency is, for example, 10-30 kHz, and is preferably 16-20 kHz.

The plasma irradiation distance is, for example, 2-30 mm, and is preferably 10-15 mm. If the plasma irradiation distance is short, the reinforcing fibers 21 may be damaged, and if the plasma irradiation distance is long, the surface modification effect is reduced.

The plasma irradiation time is, for example, 0.1-5.0 seconds, and is preferably 0.5-1.0 second. If the plasma irradiation time is short, the surface modification effect is reduced, and if the plasma irradiation time is long, the reinforcing fibers 21 may be damaged.

An example of a plasma gas that can be used is a mixed gas containing 0.5% or more of oxygen, nitrogen, or helium.

The impregnation unit 130 impregnates, with resin 22, the reinforcing fibers 21 that are irradiated with plasma P. The impregnation unit 130 includes a storage unit 131 in which the resin 22 is stored and a rotation unit 132 that rotates in synchronization with the transport of the reinforcing fibers 21 while being in contact with the reinforcing fibers 21, as illustrated in FIG. 5. The impregnation unit 130 further includes an adjustment unit 133 that adjusts the amount of the resin 22 that adheres to the rotation unit 132, and a pair of rollers 134, 135 that is provided on the upstream side and the downstream side of the rotation unit 132 in the transport direction and that maintain the tensile force. In addition, the impregnation unit 130 further includes a guide portion 136 that is provided on the downstream side of the downstream side roller 135 and guides the reinforcing fibers 21 toward the liner 10.

The storage unit 131 has a recessed portion 131A on the top, and the resin 22 is stored in the recessed portion 131A, as illustrated in FIG. 5.

The rotation unit 132 is in contact with the resin 22 that is stored in the recessed portion 131A on the lower side and rotates while being in contact with the reinforcing fibers 21 being transported on the upper side. The rotation unit 132 rotates clockwise in synchronization with the transport of the reinforcing fibers 21. By the rotation unit 132 rotating clockwise in this manner, the resin 22 that is adhered to the outer perimeter of the rotation unit 132 is lifted upward and adheres to the reinforcing fibers 21 on which the plasma P has been irradiated. It is thereby possible to impregnate the reinforcing fibers 21 with the resin 22 to form the reinforcing members 20. The rotation unit 132 maintains the tensile force of the reinforcing fibers 21 on which the plasma P has been irradiated together with the rollers 134, 135.

The adjustment unit 133 adjusts the amount of the resin 22 that is adhered to the outer perimeter of the rotation unit 132. The adjustment unit 133 includes a removal part 133A that removes only a predetermined amount of the resin 22 by coming in contact with the resin 22 that is adhered to the outer perimeter of the rotation unit 132 and a moving part 133B that moves the removal part 133A so as to be able to move toward and away from the rotation unit 132.

When the moving part 133B moves the removal part 133A to the right side in FIG. 5, a larger amount of the resin 22 that is adhered to the outer perimeter of the rotation unit 132 is removed. On the other hand, when the moving part 133B moves the removal part 133A to the left side in FIG. 5, a smaller amount of the resin 22 that is adhered to the outer perimeter of the rotation unit 132 is removed.

The guide portion 136 guides the reinforcing fibers 21 that are impregnated with the resin 22 toward the liner 10. The guide portion 136 has an L shape.

The configuration of the impregnation unit 130 is not particularly limited as long as the configuration is capable of impregnating, with resin 22, the reinforcing fibers 21 that are irradiated with plasma P.

The transport unit 140 winds the reinforcing members 20 that are formed by impregnating, with the resin 22, the reinforcing fibers 21 on the surface 21A of which the plasma P has been irradiated, around the outer perimeter surface 10A of the liner 10, while transporting the reinforcing fibers 21 from the left side to the right side in FIG. 5. The transport unit 140 is a motor.

The detection unit 150 detects the transport speed of the reinforcing fibers 21. A known speed sensor may be used as the detection unit 150. The location where the detection unit 150 is disposed is not particularly limited as long as the location is within a range in which the reinforcing fibers 21 are transported.

The control unit 160 carries out operation control of the irradiation unit 120, the transport unit 140, and the like. A control unit configured from a known microcomputer comprising a CPU, a RAM, a ROM, and the like may be used as the control unit 160.

Method for Producing the High-Pressure Gas Storage Container

Figure 6:
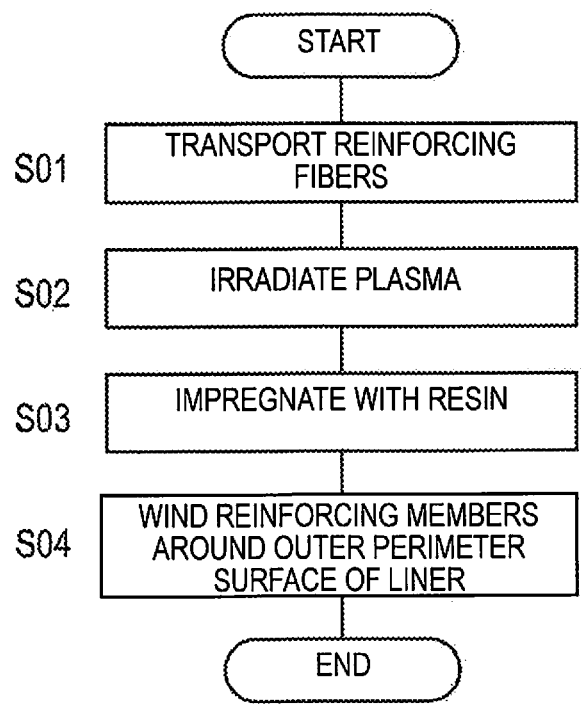
FIG. 6 is a flowchart illustrating a method for producing the high-pressure gas storage container.

Next, a method for producing the high-pressure gas storage container 1 according to the present embodiment will be described, with reference to the flowchart of FIG. 6. The method for producing the high-pressure gas storage container 1 according to the present embodiment is carried out according to the filament winding method.

First, the transport unit 140 is operated in a state in which the bobbin-like reinforcing fibers 21 are set in the setting part 111 and the liner 10 is set in the position shown in FIG. 5. The liner 10 thereby rotates and the reinforcing fibers 21 are transported (S01). At this time, the detection unit 150 detects the transport speed of the reinforcing fibers 21.

Next, the irradiation unit 120 irradiates plasma P on the reinforcing fibers 21 that are being transported (S02). The Step S02 for irradiating plasma P includes a first irradiation step for irradiating the plasma P on the reinforcing fibers 21 that constitute the reinforcing member 20A that is wound in the hoop layer 31. In addition, the Step S02 for irradiating plasma P includes a second irradiation step for irradiating the plasma P on the reinforcing fibers 21 that constitute the reinforcing member 20B that is wound in the helical layer 32.

The first irradiation step and the second irradiation step are alternately carried out. Additionally, the irradiation amount of plasma P that is irradiated in the first irradiation step is less than the irradiation amount of plasma P that is irradiated in the second irradiation step.

The irradiation amount of plasma P is adjusted by adjusting the irradiation intensity of the irradiation unit 120 and the transport speed of the reinforcing fibers 21. That is, the irradiation amount of plasma P is reduced by adjusting the irradiation intensity of the irradiation unit 120 to be weak and increasing the transport speed of the reinforcing fibers 21 in the first irradiation step. On the other hand, the irradiation amount of plasma P is increased by adjusting the irradiation intensity of the irradiation unit 120 to be strong and decreasing the transport speed of the reinforcing fibers 21 in the second irradiation step.

In the first irradiation step, the irradiation intensity of the plasma P can be reduced with respect to the reinforcing fibers 21 that constitute the reinforcing member 20A that is wound in the hoop layer 31, for which strength is not relatively required. Therefore, it is possible to reduce the amount of plasma gas that is used and to reduce the running cost.

In addition, in the first irradiation step, it is possible to increase the transport speed of the reinforcing fibers 21 when irradiating plasma P on the reinforcing fibers 21 that constitute the reinforcing member 20A that is wound in the hoop layer 31, for which strength is not relatively required. Therefore, it is possible to reduce the manufacturing time and to improve productivity.

Next, the reinforcing fibers 21 on which the plasma P has been irradiated are impregnated with the resin 22 (S03).

The reinforcing member 20A is formed by impregnating the reinforcing fibers 21 with the resin 22 on which the plasma P has been irradiated in the first irradiation step. Additionally, the reinforcing member 20B is formed by impregnating the reinforcing fibers 21 with the resin 22 on which the plasma P has been irradiated in the second irradiation step. Here, because more plasma P is irradiated in the second irradiation step than in the first irradiation step, the strength of the reinforcing member 20B is improved more than the reinforcing member 20A.

Next, the reinforcing members 20 are wound around the outer perimeter surface 10A of the liner 10 (S04). The Step S04 for winding the reinforcing members 20 includes a hoop winding step for winding the reinforcing member 20A around the body portion 11 along the circumferential direction. In addition, the Step S04 for winding the reinforcing members 20 includes a helical winding step for winding the reinforcing member 20B around the body portion 11 and the mirror portions 12 in a spiral shape.

The hoop winding step and the helical winding step are carried out alternately.

During the helical winding step, there are cases in which, particularly when winding the reinforcing member 20B around the mirror portions 12, the transport speed of the reinforcing fibers 21 changes as the diameter of the winding positions of the mirror portions 12 change. If the transport speed changes in this manner, the irradiation amount of plasma P on the reinforcing fibers 21 changes, even if the irradiation intensity of the plasma P is constant. Therefore, there is the risk that unintended variation in the strength of the reinforcing members 20 occurs within one layer 31, 32.

Therefore, in the production method according to the present embodiment, the control unit 160 adjusts the irradiation intensity of the irradiation unit 120 to keep the irradiation amount of plasma P on the reinforcing fibers 21 constant, based on information on the transport speed that is detected by the detection unit 150. Specifically, when the transport speed is relatively fast, the irradiation intensity of the plasma P is adjusted to be high, and when the transport speed is relatively slow, the irradiation intensity of the plasma P is adjusted to be low. By adjusting the irradiation intensity of the irradiation unit 120 in this manner, it is possible to suppress an occurrence of variation in the strength of the reinforcing members 20 within one layer 31, 32.

A high-pressure gas storage container 1 comprising the liner 10, a hoop layer 31 formed of the reinforcing member 20A, and a helical layer 32 formed of the reinforcing member 20B is produced using the production method described above. Here, because plasma P is irradiated on the reinforcing fibers 21, the strength of the reinforcing members 20 is improved. Accordingly, it is possible to reduce the amount of the reinforcing members 20 that are wound around the outer perimeter surface 10A of the liner 10 while suppressing a decrease in the strength of the high-pressure gas storage container 1.

As described above, the high-pressure gas storage container 1 according to the present embodiment comprises a liner 10 for housing high-pressure gas and a reinforcing layer 30 that is formed by winding strip-shaped reinforcing members 20 around the outer perimeter surface 10A of the liner 10. The reinforcing members 20 are made of reinforcing fibers 21 that are impregnated with resin 22 and that are irradiated with plasma P. According to a high-pressure gas storage container 1 configured in this manner, it is possible to add an acid functionality to the reinforcing fibers 21 by irradiating plasma P on the reinforcing fibers 21. As a result, the adhesiveness of the resin 22 to the reinforcing fibers 21 is improved, and the strength of the reinforcing members 20 is improved. Therefore, it is possible to reduce the amount of the reinforcing members 20 that are wound around the outer perimeter surface 10A of the liner 10 to achieve a reduction in weight while suppressing a decrease in the strength, compared to a case in which plasma P is not irradiated.

In addition, the liner 10 comprises a body portion 11 that is provided in a tubular shape at the center in the axial direction X and mirror portions 12 that are provided on both sides of the body portion 11 in the axial direction and that are curved so as to taper in the axial direction X towards the outside. The reinforcing layer 30 includes a hoop layer 31 formed by winding the reinforcing member 20A around the body portion 11 along the circumferential direction and a helical layer 32 formed by winding the reinforcing member 20B around the body portion 11 and the mirror portions 12 in a spiral shape. The reinforcing fibers 21 that constitute the reinforcing member 20B that is wound in the helical layer 32 is formed by irradiating the plasma P. Here, the helical layer 32 contributes to securing the strength of the shoulder portions 14 where bending strength is required. According to the high-pressure gas storage container 1 configured in this manner, it is possible to improve the strength of the shoulder portions 14 because plasma P is irradiated on the reinforcing fibers 21 that constitute the reinforcing member 20B that is wound in the helical layer 32. In particular, because the bending strength of the reinforcing member 20B is suitably improved by means of irradiating plasma P, it is possible to suitably improve the bending strength of the shoulder portions 14.

In addition, the reinforcing fibers 21 that constitute the reinforcing member 20A that is wound in the hoop layer 31 is formed by irradiating the plasma P. In addition, the reinforcing fibers 21 that constitute the reinforcing member 20A that is wound in the hoop layer 31 is configured such that the amount of plasma P that is irradiated thereon is less than that of the reinforcing fibers 21 that constitute the reinforcing member 20B that is wound in the helical layer 32. According to the high-pressure gas storage container 1 configured in this manner, it is possible to improve the strength of the body portion 11 because plasma P is irradiated on the reinforcing fibers 21 that constitute the reinforcing member 20A that is wound in the hoop layer 31. On the other hand, the irradiation intensity of the plasma P can be reduced with respect to the reinforcing fibers 21 that constitute the reinforcing member 20A that is wound in the hoop layer 31, for which strength is not relatively required. Therefore, it is possible to reduce the amount of plasma gas that is used and to reduce the running cost.

In addition, as described above, the method for producing a high-pressure gas storage container 1 according to the present invention is a method for producing a high-pressure gas storage container 1 comprising a liner 10 for housing high-pressure gas and a reinforcing layer 30 that is formed by winding strip-shaped reinforcing members 20 around the outer perimeter surface 10A of the liner 10. In the method for producing the high-pressure gas storage container 1, plasma P is irradiated on reinforcing fibers 21, reinforcing members 20 are formed by impregnating the reinforcing fibers 21 with resin 22, and the reinforcing members 20 are wound around the outer perimeter surface 10A of the liner 10. According to the method for producing the high-pressure gas storage container 1, it is possible to add an acid functionality to the reinforcing fibers 21 by irradiating plasma P on the reinforcing fibers 21. As a result, the adhesiveness of the resin 22 to the reinforcing fibers 21 is improved, and the strength of the reinforcing members 20 is improved. Therefore, it is possible to reduce the amount of the reinforcing members 20 that are wound around the outer perimeter surface 10A of the liner 10 to achieve a reduction in weight while suppressing a decrease in the strength, compared to a case in which plasma P is not irradiated.

Additionally, the winding step includes a helical winding step for winding the reinforcing member 20B comprising the reinforcing fibers 21 on which the plasma P has been irradiated around the liner 10 in a spiral shape, when winding the reinforcing members 20 around the outer perimeter surface 10A of the liner 10. Here, the helical layer 32 that is formed by the helical winding step contributes to securing the strength of the shoulder portions 14 where bending strength is required. According to this production method, is possible to improve the strength of the shoulder portions 14 because plasma P is irradiated on the reinforcing fibers 21 that constitute the reinforcing member 20B that is wound in the helical layer 32. In particular, because the bending strength of the reinforcing member 20B is suitably improved by means of irradiating plasma P, it is possible to suitably improve the bending strength of the shoulder portions 14 and to suppress an occurrence of stress concentration at the shoulder portions 14.

Additionally, the winding step further includes a hoop winding step for winding the reinforcing member 20A comprising the reinforcing fibers 21 on which the plasma P has been irradiated around the body portion 11 along the circumferential direction when winding the reinforcing members 20 around the outer perimeter surface 10A of the liner 10. The reinforcing fibers 21 that constitute the reinforcing member 20A that is wound in the hoop winding step is configured such that the irradiation amount of plasma P is smaller than that of the reinforcing fibers 21 that constitute the reinforcing member 20B that is wound in the helical winding step. According to the high-pressure gas storage container 1 produced using this production method, it is possible to improve the strength of the body portion 11 because plasma P is irradiated on the reinforcing fibers 21 that constitute the reinforcing member 20A that is wound in the hoop layer 31. On the other hand, the irradiation intensity of the plasma P can be reduced with respect to the reinforcing fibers 21 that constitute the reinforcing member 20A that is wound in the hoop layer 31, for which strength is not relatively required. Therefore, it is possible to reduce the amount of plasma gas that is used and to reduce the running cost.

Additionally, the transport speed of the reinforcing fibers 21 when the irradiation amount of plasma P is relatively small is faster than the transport speed of the reinforcing fibers 21 when the irradiation amount of plasma P is relatively large. According to this production method, it is possible to reduce the manufacturing time and to improve productivity.

In addition, the irradiation intensity of the plasma P is adjusted such that the irradiation amount of plasma P with respect to the reinforcing fibers 21 becomes constant, in accordance with changes in the transport speed of the reinforcing fibers 21 in the helical winding step. According to this production method, it is possible to suppress an occurrence of variation in the strength of the reinforcing members 20 within one layer 31, 32, which constitutes the reinforcing layer 30.

Additionally, the plasma P is irradiated on the surface 21A of the reinforcing fibers 21 from a direction that is tilted from a direction that is orthogonal to the surface 21A.

According to this configuration, because the plasma P is irradiated from a direction that is tilted from the surface 21A of the reinforcing fibers 21, compression of the plasma gas is suppressed, and it is possible to carry out irradiation while letting the high-temperature portion in the center escape. Therefore, it is possible to efficiently irradiate plasma P on the reinforcing fibers 21 and to add an acid functionality to the reinforcing fibers 21, while reducing damage to the reinforcing fibers 21.

First Modified Example

A modified example of the above-described embodiment will be described below.

Figure 7:
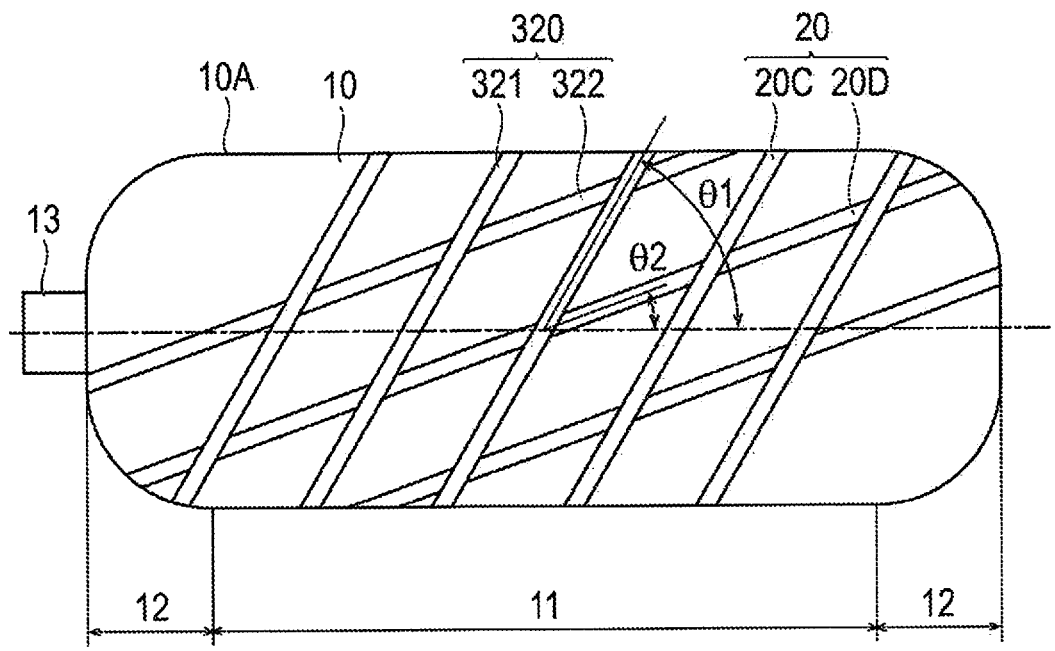
FIG. 7 is a view illustrating a high-pressure gas storage container according to a first modified example.

A high-pressure gas storage container 2 according to a first modified example is different from the high-pressure gas storage container 1 according to the embodiment described above in the configuration of the helical layer 320. FIG. 7 is a view illustrating a high-pressure gas storage container 2 according to the first modified example. In FIG. 7, for ease of understanding, an illustration of the hoop layer 31 is omitted.

The helical layer 320 of the high-pressure gas storage container 2 according to the first modified example includes a first helical layer 321 formed by winding a reinforcing member 20C at an angle that is tilted from the axial direction X by a first tilt angle $\theta1$, as illustrated in FIG. 7. In addition, the helical layer 320 includes a second helical layer 322 formed by winding a reinforcing member 20D at an angle that is tilted from the axial direction X by a second tilt angle $\theta2$, which is smaller than the first tilt angle $\theta1$.

Here, the boundary angle between the first tilt angle $\theta1$ and the second tilt angle $\theta2$ shall be 55 degrees, which tilt angle can, in theory, optimally secure strength against the internal pressure of the cylindrical part. At this time, the first helical layer 321 contributes greatly to the effect of the hoop layer 31, that is, securing the strength of the body portion 11 in the circumferential direction. On the other hand, compared to the first helical layer 321, the second helical layer 322 contributes more to securing the strength of the shoulder portions 14. Accordingly, the reinforcing member 20D that is wound in the second helical layer 322 is configured to have a higher strength than the reinforcing member 20C that is wound in the first helical layer 321. Therefore, the irradiation amount of plasma P is greater in the reinforcing fibers 21 that constitute the reinforcing member 20D than in the reinforcing fibers 21 that constitute the reinforcing member 20C.

Next, a method for producing the high-pressure gas storage container 2 according to the first modified example will be described.

Here, only a step for irradiating plasma P and a step for winding reinforcing members 20 will be described.

The step for irradiating plasma P includes a first irradiation step for irradiating the plasma P on the reinforcing fibers 21 that constitute the reinforcing member 20A that is wound in the hoop layer 31. In addition, the step for irradiating plasma P includes a third irradiation step for irradiating the plasma P on the reinforcing fibers 21 that constitute the reinforcing member 20C that is wound in the first helical layer 321. Additionally, the step for irradiating plasma P includes a fourth irradiation step for irradiating the plasma P on the reinforcing fibers 21 that constitute the reinforcing member 20D that is wound in the second helical layer 322.

The irradiation amount of plasma P that is irradiated in the third irradiation step is smaller than the irradiation amount of plasma P that is irradiated in the fourth irradiation step. In addition, the irradiation amount of plasma P that is irradiated in the third irradiation step is larger than the irradiation amount of plasma P that is irradiated in the first irradiation step.

The step for winding the reinforcing members 20 includes a hoop winding step for winding the reinforcing member 20A around the body portion 11 along the circumferential direction. In addition, the step for winding the reinforcing members 20 includes a first helical winding step for winding the reinforcing member 20C around the body portion 11 and the mirror portions 12 at an angle that is tilted from the axial direction X by a first tilt angle $\theta1$. Additionally, the step for winding the reinforcing members 20 includes a second helical winding step for winding the reinforcing member 20D around the body portion 11 and the mirror portions 12 at an angle that is tilted from the axial direction X by a second tilt angle $\theta2$.

As described above, the helical layer 320 of the high-pressure gas storage container 2 according to the first modified example includes a first helical layer 321 and a second helical layer 322. The reinforcing fibers 21 that constitute the reinforcing member 20C that is wound in the first helical layer 321 is configured such that the amount of plasma P that is irradiated thereon is less than that of the reinforcing fibers 21 that constitute the reinforcing member 20D that is wound in the second helical layer 322. According to the high-pressure gas storage container 2 configured in this manner, the irradiation intensity of the plasma P can be reduced with respect to the reinforcing fibers 21 that constitute the reinforcing member 20C that is wound in the first helical layer 321, for which strength is not required compared to the second helical layer 322. Therefore, it is possible to reduce the amount of plasma gas that is used and to reduce the running cost.

The first helical layer 321 is formed by winding the reinforcing member 20C at an angle that is tilted by 55 degrees or more with respect to the axial direction X, and the second helical layer 322 is formed by winding the reinforcing member 20D at an angle that is tilted by less than 55 degrees with respect to the axial direction X. Here, if the reinforcing members 20 are wound at an angle that is tilted by 55 degrees with respect to the axial direction X, in theory, it is possible to optimally secure the strength of the liner 10 against internal pressure from the high-pressure gas. Accordingly, the first helical layer 321 contributes greatly to the effect of the hoop layer 31, that is, securing the strength of the body portion 11 in the circumferential direction. On the other hand, compared to the first helical layer 321, the second helical layer 322 contributes more to securing the strength of the shoulder portions 14. Therefore, it is possible to optimize the distribution of irradiation of the plasma P on the reinforcing fibers 21 that constitute the hoop layer 31, the first helical layer 321, and the second helical layer 322.

In addition, the helical winding step includes a first helical winding step and a second helical winding step. The reinforcing fibers 21 that constitute the reinforcing member 20C that is wound in the first helical winding step is configured such that the irradiation amount of plasma P is smaller than that of the reinforcing fibers 21 that constitute the reinforcing member 20D that is wound in the second helical winding step. According to this production method, the irradiation intensity of the plasma P can be reduced with respect to the reinforcing fibers 21 that constitute the reinforcing member 20C that is wound in the first helical layer 321, for which strength is not relatively required. Therefore, it is possible to reduce the amount of plasma gas that is used and to reduce the running cost.

In addition, in the first helical winding step, the reinforcing member 20C is wound at an angle that is tilted by 55 degrees or more with respect to the axial direction X, and, in the second helical winding step, the reinforcing member 20D is wound at an angle that is tilted by less than 55 degrees with respect to the axial direction X. Here, if the reinforcing members 20 are wound at an angle that is tilted by 55 degrees with respect to the axial direction X, in theory, it is possible to optimally secure the strength of the liner 10 against internal pressure from the high-pressure gas. Accordingly, the first helical layer 321 contributes greatly to the effect of the hoop layer 31, that is, securing the strength of the body portion 11 in the circumferential direction. On the other hand, compared to the first helical layer 321, the second helical layer 322 contributes more to securing the strength of the shoulder portions 14. Therefore, it is possible to optimize the distribution of irradiation of the plasma P on the reinforcing fibers 21 that constitute the hoop layer 31, the first helical layer 321, and the second helical layer 322.

The present invention is not limited to the embodiment and modified example described above, and various modifications are possible within the scope of the claims.

In the above-described embodiment, plasma P is irradiated on the reinforcing fibers 21 that constitute the reinforcing member 20A that is wound in the hoop layer 31. However, it is not necessary to irradiate plasma P on the reinforcing fibers 21 that constitute the reinforcing member 20A that is wound in the hoop layer 31. According to the high-pressure gas storage container and the method for producing the high-pressure gas storage container configured in this manner, it is possible to reduce the amount of plasma gas that is used and to reduce the running cost.

In addition, in the above-described first modified example, plasma P is irradiated on the reinforcing fibers 21 that constitute the reinforcing member 20C that is wound in the first helical layer 321. However, it is not necessary to irradiate plasma P on the reinforcing fibers 21 that constitute the reinforcing member 20C that is wound in the first helical layer 321.

Additionally, in the embodiment and the first modified example described above, plasma P is irradiating on all of the reinforcing fibers 21 that constitute the reinforcing layer 30. However, any mode in which plasma P is irradiated on at least a portion of the reinforcing fibers 21 that constitute the reinforcing layer 30 is included in the present invention.

In addition, in the above-described embodiment, the liner 10 has a cylindrical shape, but it may have a quadrangular prism shape or the like.

Additionally, in the above-described first modified example, the angle of the boundary between the first helical layer 321 and the second helical layer 322 was set to 55 degrees, but no limitation is imposed thereby.

The invention claimed is:

1. A high-pressure gas storage container comprising:
a liner for housing high-pressure gas; and
a reinforcing layer including a plurality of strip-shaped reinforcing members wound around an outer perimeter surface of the liner;
the reinforcing members including a plurality of reinforcing fibers that are impregnated with resin,
the liner comprising a body portion having in a center with a tubular shape extending in an axial direction, a pair of mirror portions provided on opposite sides of the body portion with respect the axial direction and curved to taper outwardly in the axial direction, and a pair of shoulder portions located at boundaries between an inner perimeter surface of the body portion and inner perimeter surfaces of the mirror portions, and
at least the reinforcing fibers of the reinforcing members located at the shoulder portions of the body portion having been irradiated with plasma.

2. The high-pressure gas storage container according to claim 1, wherein
the reinforcing layer includes a hoop layer having one of the reinforcing members wound around the body portion along the circumferential direction, and a helical layer having one of the reinforcing members wound around the body portion and the mirror portions in a spiral shape, and
the reinforcing fibers that constitute the reinforcing member that is wound in the helical layer having been irradiated with the plasma.

3. The high-pressure gas storage container according to claim 2, wherein
the reinforcing fibers that constitute the reinforcing member that is wound in the hoop layer having been irradiated with the plasma, and
the reinforcing fibers that constitute the reinforcing member that is wound in the hoop layer is configured such that an amount of the plasma that has been irradiated thereon is less than that of the reinforcing fibers that constitute the reinforcing member that is wound in the helical layer.

4. The high-pressure gas storage container according to claim 2, wherein
the reinforcing fibers that constitute the reinforcing member that is wound in the hoop layer has not been irradiated with plasma.

5. The high-pressure gas storage container according to claim 2, wherein
the helical layer includes a first helical layer defined by the reinforcing member wound at an angle that is tilted from the axial direction by a first tilt angle, and a second helical layer defined by the reinforcing member wound at an angle that is tilted from the axial direction by a second tilt angle, which is smaller than the first tilt angle, and
the reinforcing fibers that constitute the reinforcing member that is wound in the first helical layer is configured such that an amount of the plasma that has been irradiated thereon is less than that of the reinforcing fibers that constitute the reinforcing member that is wound in the second helical layer.

6. The high-pressure gas storage container according to claim 5, wherein
the first helical layer is defined by the reinforcing member wound at an angle that is tilted by 55 degrees or more with respect to the axial direction, and
the second helical layer is defined by the reinforcing member wound at an angle that is tilted by less than 55 degrees with respect to the axial direction.

* * * * *